United States Patent
O'Leary

(10) Patent No.: US 6,461,037 B1
(45) Date of Patent: Oct. 8, 2002

(54) THERMOMETER PROBE FOR USE WITH DISPOSABLE PROBE COVER

(75) Inventor: Stephen H. O'Leary, Encinitas, CA (US)

(73) Assignee: ALARIS Medical Systems, Inc., San Diego, CA (US)

( * ) Notice: Subject to any disclaimer, the term of this patent is extended or adjusted under 35 U.S.C. 154(b) by 0 days.

(21) Appl. No.: 09/261,611

(22) Filed: Feb. 28, 1999

(51) Int. Cl.[7] .................................................. G01K 1/08
(52) U.S. Cl. ........................................ 374/158; 374/209
(58) Field of Search ................................... 374/158, 209

(56) References Cited

U.S. PATENT DOCUMENTS

| | | | | |
|---|---|---|---|---|
| 738,960 A | * | 9/1903 | Vaughan et al. | 374/209 |
| 1,363,259 A | * | 12/1920 | Mills | 374/209 |
| 2,969,141 A | * | 1/1961 | Katzin | 374/209 |
| 3,349,896 A | * | 10/1967 | Ensign et al. | 374/158 |
| 3,738,172 A | | 6/1973 | Sato | 73/343 |
| 3,738,173 A | | 6/1973 | Sato | 73/343 |
| 3,738,479 A | | 6/1973 | Sato | 206/16.5 |
| 3,833,115 A | * | 9/1974 | Schapker | 374/158 |
| 3,905,232 A | | 9/1975 | Knute | 73/362 |
| 3,929,018 A | * | 12/1975 | Turner | 374/158 |
| 3,999,434 A | * | 12/1976 | Yen | 374/158 |
| 4,054,057 A | * | 10/1977 | Kluge | 374/158 |
| 4,117,926 A | * | 10/1978 | Turner et al. | 374/209 |
| 4,159,766 A | * | 7/1979 | Kluge | 374/209 |
| 4,341,992 A | * | 7/1982 | Goldstein | 374/158 |
| 4,343,185 A | | 8/1982 | Knute | 374/158 |
| 4,457,633 A | * | 7/1984 | Andrews | 374/209 |
| 4,588,306 A | * | 5/1986 | Burger et al. | 374/209 |
| 4,823,949 A | * | 4/1989 | Bala | 374/158 |
| 4,863,281 A | * | 9/1989 | Suszynski | 374/209 |
| 5,340,215 A | * | 8/1994 | Makita et al. | 374/158 |
| 5,645,350 A | * | 7/1997 | Jang | 374/209 |

* cited by examiner

Primary Examiner—Diego Gutierrez
Assistant Examiner—Yaritza Guadalupe
(74) Attorney, Agent, or Firm—Fulwider Patton Lee & Utecht, LLP

(57) ABSTRACT

A medical probe having a handle with an end cap mounted at the proximal end of the handle for urging ejector wires through the handle and out of the distal end of the handle to push off a probe cover frictionally secured to the probe and overlying a probe shaft. The retention device to retain the probe cover on the probe comprises a lip that forces the probe cover into a different shape. The probe shaft is secured to the handle and is slidable axially within the handle and is urged into a fully extended position by a coil spring mounted in the handle. A cable runs through the end cap for connecting the sensor located in the probe to a measurement and display device, such as a thermometer. The end cap has a radius that assists in relieving stress on the cable.

32 Claims, 5 Drawing Sheets

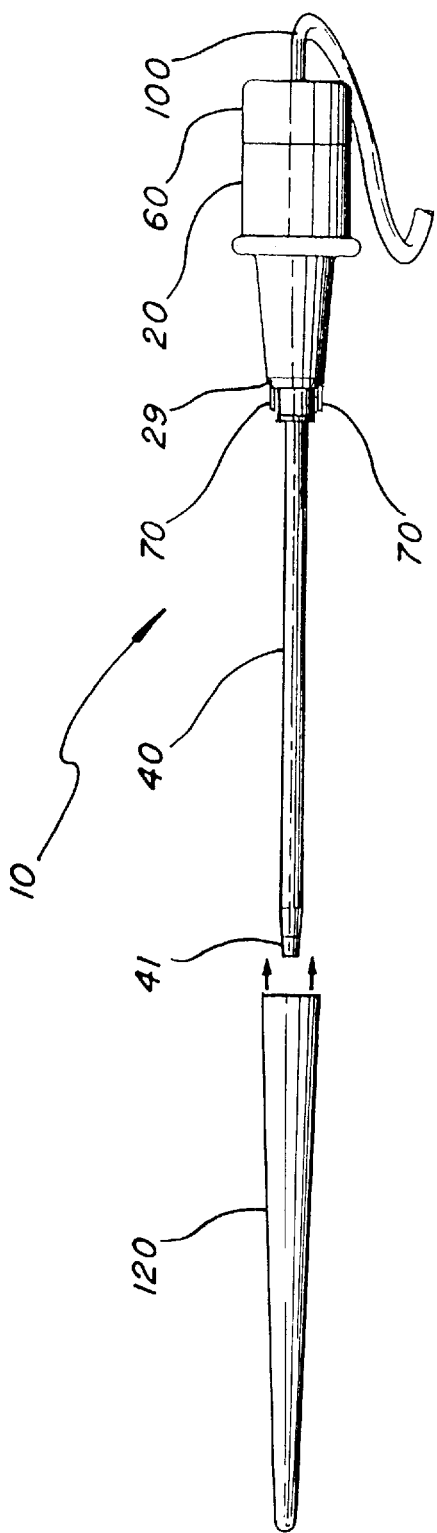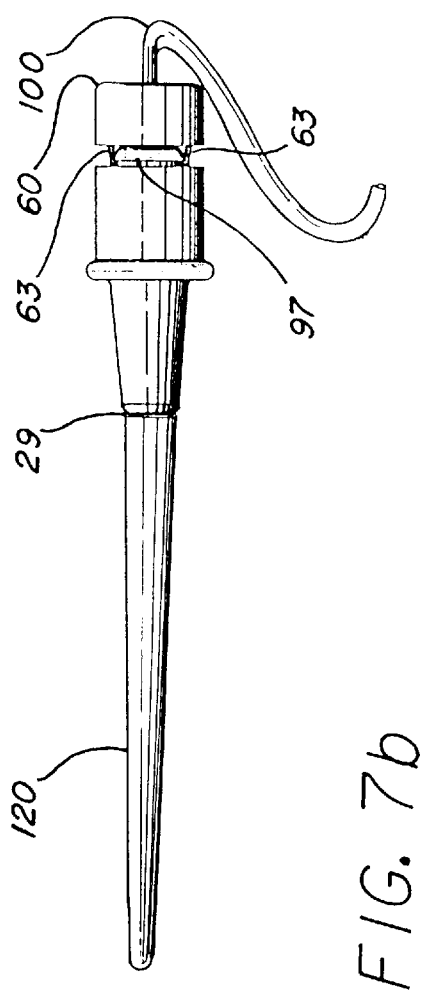
FIG. 7a
FIG. 7b

THERMOMETER PROBE FOR USE WITH DISPOSABLE PROBE COVER

BACKGROUND

The present invention relates generally to medical temperature probes, and more particularly to a temperature probe comprising a spring-loaded shaft for maintaining a constant force between the shaft and a temporary, disposable probe cover, and a mechanism to eject the probe cover from the probe.

Medical thermometers are useful in the diagnosis and treatment of many diseases. It is common practice in the medical arts, as in hospitals and in doctors' offices, to measure the body temperature of a patient by means of a glass bulb thermometer incorporating a heat responsive mercury column that expands and contracts adjacent a calibrated temperature scale. It is also known to use electronic thermometers that operate to sense the patient's temperature for a short period of time and then extrapolate to predict the actual patient temperature. This latter thermometer results in the determination of a patient's temperature in a much shorter time period than with mercury glass bulb thermometers.

While these thermometers have been used for many years and have been found to provide useful results in diagnosing and treating patients, some of those who use them desire a thermometer that determines a patient's temperature more rapidly. For example, a mercury thermometer typically takes at least five minutes or more to determine a patient's temperature. An electronic predictive thermometer can take one or more minutes in its predictive mode and five or more minutes in its monitoring or direct reading mode. Electronic predictive thermometers have become popular because in their predictive mode, the time for taking the temperature is much less than the mercury thermometer. For busy nursing staffs, time is of the essence. Taking a temperature in one minute is much more desirable than taking a temperature in five minutes. More patients can be served with the faster thermometer and the nursing staff can be more productive.

Additionally, the more time that a probe must be in a patient's mouth to make a temperature determination, the more likely it is that the probe will not remain in the correct location. This is particularly true with younger patients who tend to be impatient. For patients who cannot be relied upon (by virtue of age or infirmity for example) to properly retain the thermometer for the necessary period of insertion in the body, the physical presence of medical personnel during a relatively long measurement cycle is necessary. Taking a temperature of younger patients in one minute is immensely more desirable than taking the temperature in five minutes. Thus, the predictive electronic thermometer has substantially advanced the art of temperature determination.

In addition to the above, rapid reuse on other patients is also a goal. However, with reuse, precaution must be taken to avoid the possibility of cross contamination between patients. Consequently, protective covers have been designed for use with the probes of thermometers. The protective cover is designed to completely envelop the portion of the thermometer that comes into contact with the patient. Because the protective cover may then be removed and discarded after use of the thermometer, and because the protective cover has protected the thermometer from contact with the patient, the thermometer may be immediately reused by simply applying another protective cover.

Protective probe covers have been available for predictive electronic thermometers for many years making the thermometer rapidly reusable when properly used with such covers. However, a protective cover adds material between the temperature sensor in the probe of the thermometer and the heat source; i.e., the patient. Additional material between the patient and the sensor can slow down the process of determining the patient's temperature as heat from the patient must first pass through the probe cover before it reaches the sensor. Gains made in permitting immediate reuse of thermometers due to the use of a disposable probe cover may thus be offset by the increasing length of time it takes to obtain a reading, caused by that same probe cover.

In addition, given that each probe cover is used only once and then discarded, it is desirable that such probe covers be as inexpensive as possible. They should be efficiently produced from readily available, inexpensive materials utilizing common manufacturing techniques. Thus, materials offering good heat transfer characteristics and that are easily injection molded, such as thermoplastics, are desired in fabricating probe covers.

One factor in obtaining a temperature measurement in as short a time as possible is to improve the heat transfer characteristics between the probe and the probe cover. A consideration in the heat transfer characteristics of a probe cover is the contact the probe cover makes with the probe tip in which the temperature sensor is located. As is well known to those skilled in the art, air located between a probe cover and the sensor in the probe tip will act as an insulator and will slow down the transfer of patient heat to the sensor. It will then take longer to obtain a measurement of the patient's temperature. Poor contact between the probe cover and the probe will also slow down the measurement process in that heat from the patient will take longer to reach the sensor in the probe tip. Consequently, most probe and probe cover systems are designed and configured to achieve good contact between the tip of the probe, where the temperature sensor is located, and the inside surface of the probe cover so that patient heat is transferred more quickly to the temperature sensor.

Probes used with probe covers by necessity have a cover retention mechanism. A number of prior art devices relied upon the interference fit between the probe shaft distal tip and the probe cover for retaining the cover onto the probe. It is desirable in some cases where a precise interface between the probe tip and the probe cover is required to retain the probe cover onto the probe by other means.

Another design for cover retention is a split ring. In use, the probe cover is mounted over the probe shaft and pressed down over the split ring, forcing the ring to contract and thus allow the probe cover to slip over its outer periphery. The natural tendency of the ring is to return to its original shape thereby applying outward force against the probe cover, and thus retaining the cover in position over the probe. While this design has been accepted and has provided improvement to the art, in some cases a less complex design would be desired. The split ring is an extra part that must be manufactured and assembled with the probe, and thus adds to the overall complexity and cost of the probe.

Thermometers having a probe configured for receiving disposable probe covers have also been used for many years with ejection systems. In one particular design, an ejection mechanism is used to detach the probe cover from the probe after use so that the contaminated probe cover can be directly discarded without the operator having to touch it. In the typical case, the probe is held over a waste receptacle, the ejection button is pressed which detaches the probe cover from the probe and the probe cover falls into the waste receptacle. Different types of ejection mechanisms exist.

In one ejection mechanism, the probe shaft of the thermometer is coupled directly to the ejection mechanism. The probe cover is mounted over the probe and is retained in position by a retention device located at the distal end of a handle forming part of the probe. For ejection, the ejection button is pressed which causes the probe shaft to extend farther out of the probe handle pushing the probe cover also in a distal direction away from the retention device and dislodging the probe cover from a retention device. The probe cover then falls off the probe. Some improvement on this device is desired as the ejection button provides a natural resting place for the user's thumb, and in some cases, the user may inadvertently and prematurely press the ejection button before the temperature measurement has been completed. This inadvertent pressing may move the probe cover in relation to the probe and change the quality of contact of the probe cover with the probe tip. As discussed above, the heat transfer characteristics between the probe cover and the probe tip can affect the speed with which the thermometer can measure the patient's temperature. Should the quality of contact be changed, the patient's temperature measurement may be slowed down. Thus, it would be desirable to decouple the ejection button from contact with the probe tip and probe cover.

In a worse case, the inadvertent press of the ejection button may cause the probe cover to come completely off the probe before or during the measurement procedure. The measurement may then have to be repeated with a new probe cover thus wasting time of the patient and nurse, and wasting a probe cover.

In another approach, the probe is fixed to the handle and has a fixed length. Ejection of the probe cover is effected by a mechanism that presses against the proximal edge of the probe cover. Probe covers used with this type of probe must be manufactured in a relatively specific range of lengths, because a cover that is too short will not engage the retainer device and a cover that is too long will not make proper, or any, contact with the probe tip and thus not provide the speed of measurement desired. Such tight manufacturing tolerances typically require sophisticated equipment and additional processing and quality control steps, and thus usually lead to increased production costs.

Hence those skilled in the art have recognized a need for a temperature probe usable with probe covers that can be inexpensively produced from readily available, inexpensive materials utilizing common manufacturing techniques. In addition, it has been recognized by those skilled in the art that a need exists for an ejection mechanism that is decoupled from the probe tip/probe cover contact so as to not affect such contact until actual disposal of the probe cover is desired. The invention fulfills these needs and others.

SUMMARY OF THE INVENTION

Briefly and in general terms, the present invention is directed to a temperature probe for use with a probe cover having a closed distal end and an open proximal end, comprising a shaft having a distal end for receipt into the probe cover through the probe cover open proximal end and a proximal section, a retention device located at the proximal section of the shaft configured to engage the proximal end of the probe cover and retain it in position on the shaft, a handle disposed at the proximal section of the shaft such that the shaft extends into the handle for axial movement therein between a fully retracted position and a fully extended position, the handle having a proximal end, a biasing member disposed within the handle and urging the shaft to the extended position, the biasing member providing less force to move the shaft into the extended position than the force that the retention device is providing to retain the probe cover on the shaft, an ejector control having a distal end slidably received in the proximal end of the handle and having a proximal end for use in receiving force that urges the ejector control into the handle, and an ejector member connected with the ejector control and extending longitudinally through the handle to exit the handle adjacent the shaft and contact the probe cover at its proximal end whereby moving the ejector control in a predetermined direction will cause the ejector member to press against the proximal end of the probe cover and displace it from contact with the retention device, whereby the probe cover may be removed from contact with the probe.

In further detailed aspects, the retention device comprises a raised lip formed in a shape different that than of the proximal end of the probe cover such that when mounting the probe cover onto the retention device, the proximal end of the probe cover is forced to conform to the shape of the lip. The circumferential size of the lip is approximately equal to the circumferential size of the probe cover whereby the probe cover is held onto the lip by the forces exerted against the lip by the probe cover as a result of the different shape the probe cover has been forced into by the lip. The lip is generally oval in shape.

In other aspects, the ejector member comprises two ejector devices and the oval shape of the lip includes two flat portions diametrically located at which the ejector devices exit the handle to contact and eject the probe cover. The retention device comprises at least one barb protruding radially outwardly adjacent the distal end of the handle which secures the probe cover thereto. The biasing member comprises a spring which is placed under compression when a probe cover is mounted to the probe, whereby the spring continually urges the probe against the probe cover. The biasing member is selected such that the force it exerts against the shaft is within a selected range. In another aspect, the range of force exerted by the biasing member is between one half pound and one pound.

In yet further aspects, the ejector member comprises two ejection devices located diametrically opposite each other about the shaft. The ejector devices comprise pins located in the handle so as when the ejection control is activated, the ejector devices contact the proximal end of the probe cover and move it in a distal direction off the retention device.

In other detailed aspects, the length of the probe is selected to be longer than the probe cover such that when the probe cover is properly mounted on the probe the probe shaft is retracted. The ejector control comprises an end surface formed with an aperture therein for slidably accepting an electrical conductor therethrough. The end surface of the ejector control is curved outwardly from the aperture for controlling the maximum degree of curvature to which the conductor is subjected as it exits the probe. The end surface has a curved funnel-shaped surface to control the maximum amount of curvature of a cable extending through the opening.

In yet other detailed aspects, the retention device is formed as part of the handle and comprises a lip protruding radially outwardly from the distal end of the handle and having a diameter selected to be larger than the inside diameter of the probe cover thereby securing the probe cover thereupon.

In yet another aspect, provided is a temperature probe for use with a probe cover having a closed distal end and an open proximal end, comprising a handle having a proximal end and a distal end, a probe shaft having a proximal section mounted to the handle distal end and a distal end for receipt into the probe cover through the probe cover open proximal end, a retention device located at the distal end of the handle configured to engage the proximal end of the probe cover and retain it in position on the shaft, and an ejector member located at the handle to exit the handle adjacent the probe shaft and contact the probe cover at its proximal end whereby moving the ejector member in a distal direction will cause the ejector member to press against the proximal end of the probe cover and displace it from contact with the retention device.

These and other aspects and advantages of the invention will become apparent from the following detailed description and the accompanying drawings, which illustrate by way of example the features of the invention.

BRIEF DESCRIPTION OF THE DRAWINGS

FIGS. 7(a) and 7(b) are side views of the probe shown in FIG. 1 and a probe cover for use with the probe, with FIG. 7(a) showing the probe cover unmounted on the probe and FIG. 7(b) showing the probe cover mounted.

DETAILED DESCRIPTION OF THE PREFERRED EMBODIMENTS

Figure 1:
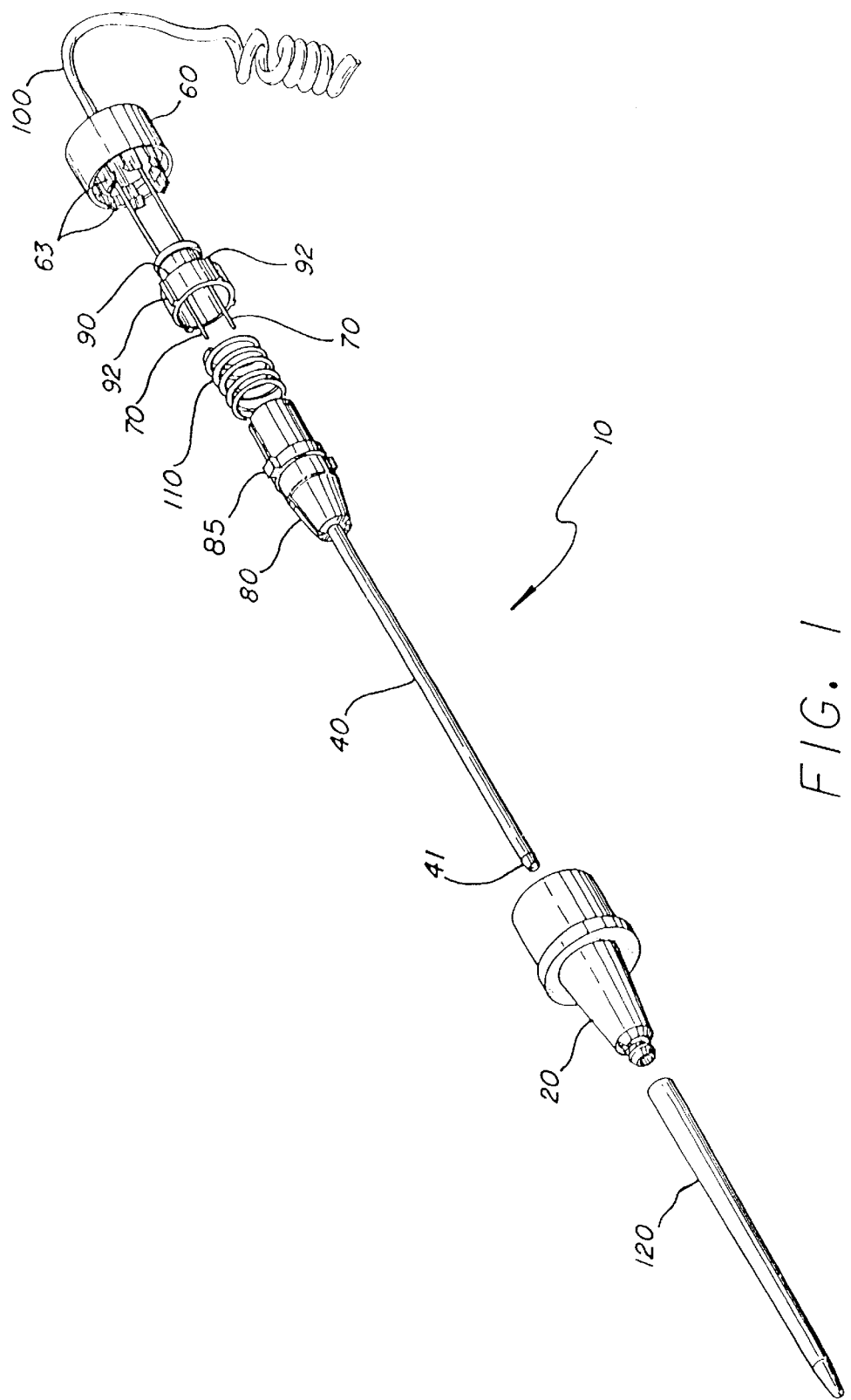
FIG.1 is an exploded perspective view of a medical probe according to the present invention also showing a probe cover for use with the probe, the probe having both an ejection device at the handle and a probe cover retention device at the handle, in accordance with aspects of the invention.

Turning now to the drawings, in which like reference numerals are used to designate like or corresponding elements among the several figures, in FIG. 1 there is shown a temperature probe 10 in accordance with aspects of the present invention, comprising, generally, a probe handle 20, a probe shaft 40 attached to an inner body 80 received into the handle, an ejector control 60 received axially into the handle, a body cap 90 disposed within the handle to limit the travel of the ejector control, and a coil spring 110 disposed between the body cap and the inner body to urge the two apart and thus urge the shaft into its extended position. A probe cover 120 slides axially over the probe shaft 40.

Figure 2:
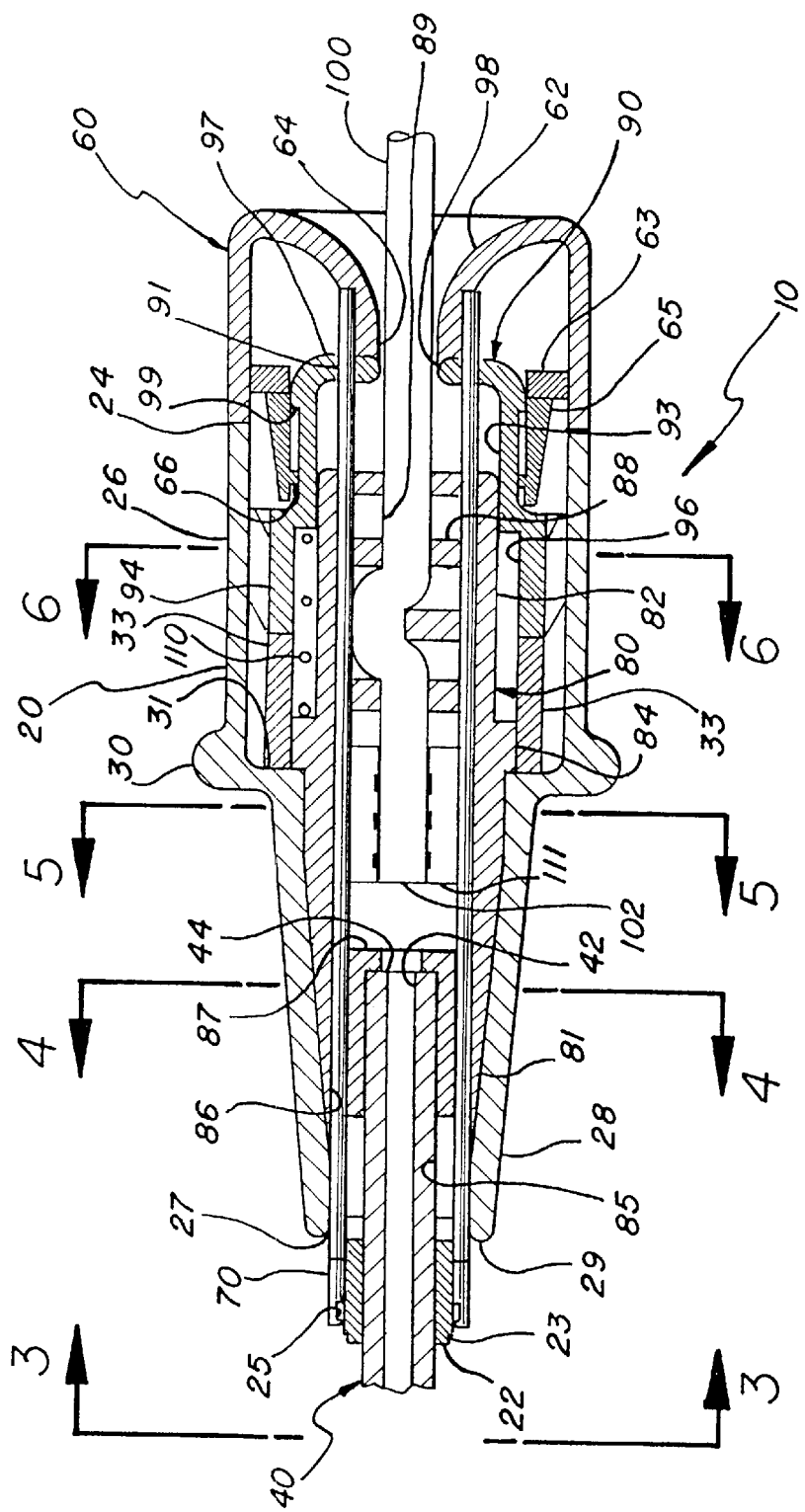
FIG. 2 is a partial side view, in cross section, of the probe and probe handle shown in FIG. 1.

With greater particularity, and referring now to FIG. 1 in combination with FIG. 2, the handle 20 is formed with an open distal end 22 and an open proximal end 24, both of which afford access into the interior of the handle. The handle 20 is generally tubular in structure and comprises three main portions: a cylindrical portion 26 adjacent the proximal end 24, a cylindrical nipple 23 adjacent the distal end 22, and a tapered portion 28 extending therebetween.

Figure 3:
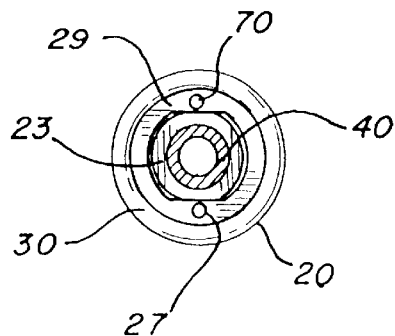
FIG. 3 is an axial view looking in the proximal direction, in cross section taken along line 3–3', of the probe and handle depicted in FIG. 2.
Figure 4:
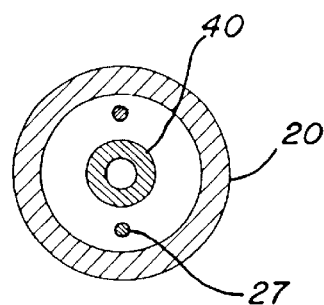
FIG. 4 is another axial view looking this time in the distal direction, in cross section taken along line 4–4', of the probe and probe handle depicted in FIG. 2.

As shown in FIGS. 2 and 3, a radially outwardly protruding, circumferential handle 30 is formed at the junction between the cylindrical portion 26 and the tapered portion 28, which is further defined by an inner ledge 31 extending around the inner circumference of the handle 20. A cover ledge 29 extends circumferentially around the juncture between the nipple 23 and the tapered portion 28, and contains two radially opposed ejector apertures 27 formed therein. A barb 25 extends circumferentially around the free end of the nipple 23 and may be formed with a relatively sharp outer edge. Two flat planes 43 are formed axially along the outer surface of the nipple 23 to extend from the cover ledge 29 to the distal end of the nipple and essentially divide the barb 25 into two identical and diametrically opposed arcs.

With continued reference to FIG. 2, the hollow inner body 80 is axially slidably disposed within the handle 20, and is likewise generally tubular in structure with a distal tapered portion 81 that abuts the inner surface of the handle tapered portion 28, and a proximal cylindrical portion 82 that is centrally disposed within the handle cylindrical portion 26. The distal tapered portion 81 is formed with a shaft channel 85 that terminates in a shaft retainer 87 which is basically a ledge extending radially inward around the inner circumference of the tapered portion 81. An inner body retainer 84 extends radially outwardly around the proximal cylindrical portion 82 at a point on the cylindrical portion such that the retainer abuts the handle inner ledge 29 when the inner body tapered portion 81 comes to rest against the handle tapered portion 28. A tubular crimp retainer 111 is disposed within the inner body 80. Other methods of retaining the distal end of the cable 100 within the probe 10 may also be employed, such as a fiberglass printed circuit board to which the electrical conductors running through the cable and through the probe shaft 40 can be soldered in contact with one another.

Figure 5:
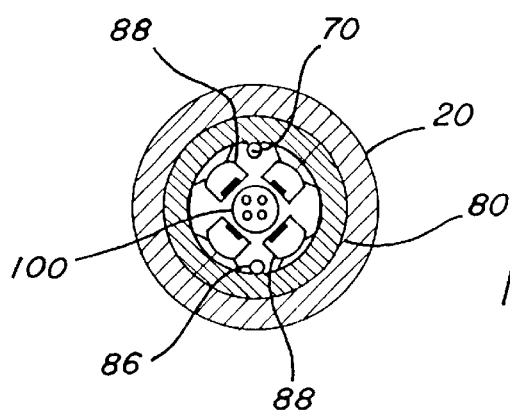
FIG. 5 is another axial view in the distal direction, in cross section taken along line 5–5', of the probe and probe handle depicted in FIG. 2.
Figure 6:
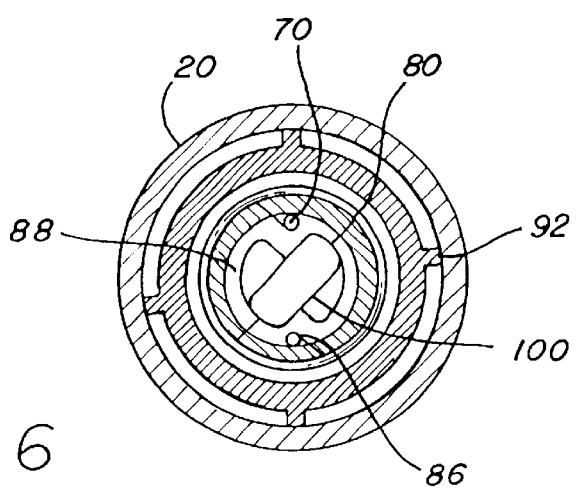
FIG. 6 is another axial view in the distal direction, in cross section taken along line 6–6', of the probe depicted in FIG. 2.

With reference now to FIGS. 2, 5 and 6 in combination, the inner body 80 is further formed with two radially opposed ejector channels 86 that extend along the length of the inner body and lie coaxial with, as well as are of equal diameter to, the ejector apertures 27 in the cover ledge 29 of the handle 20. In addition, the proximal cylindrical portion 82 of the inner body 80 contains at least three pairs of strain relief members 88 that extend radially inward in a spaced apart, staggered relationship to one another to define a cable path 89 therebetween.

With continued reference to FIG. 2, the probe 10 also includes a tubular body cap 90 centered within the cylindrical portion 26 of the handle 20 by four body cap flanges 92, which are evenly spaced around the body cap's circumference. A cap ring 33 is disposed within the probe handle 20 over the inner body 80 and bonded to the inner ledge 31 at its distal end and to the body cap 90 at its proximal end. A pair of diametrically opposed channels (not shown) are formed in the ring 33 to slidingly accept a pair of tabs 85 (see FIG. 1) formed on inner body 80 therein, and thus prevent inner body from rotating with respect to the handle 20. The body cap 90 is further formed with a small diameter proximal portion 93, which is sized to axially slidably receive the cylindrical portion 82 of the inner body 80, and a large diameter distal portion 94 which together with the inner body cylindrical portion defines a spring coil channel 96 therebetween. A coil spring 110 is disposed circumferentially over the inner body cylindrical portion 82 and within the body cap large diameter portion 94 to urge the inner body 80 axially away from the body cap 90 and against the handle surface 31. The small diameter proximal portion 93 is capped off by an end plate 97 with an inner cable aperture 98 formed centrally therein, and two ejector apertures 91 are formed coaxial with the ejector apertures 27 in the cover ledge 29 of the handle 20. A retainer stop 99 projects radially outwardly around the circumference of the body cap 90 adjacent the end plate 97.

Still referring to FIGS. 1 and 2, the probe 10 further comprises an ejector control 60, which in this embodiment is formed with a tubular structure of equal diameter to the cylindrical portion 26 of the probe handle 20, and abuts at one end the proximal end 24 of the handle. The other end of the ejector control 60 is capped off by a curved, funnel-shaped surface 62 defining the outer cable aperture 64, which is of equal diameter to and coaxial with the inner cable aperture 98. Bonded to the inner surface of the ejector control 60 are six L-shaped ejector retainers 63, which are each formed with a long arm 65 overlying the small diameter proximal portion 93 of the body cap 90 and extending axially toward the large diameter distal portion 94. Each ejector retainer arm 65 is further formed with an ejector stop 66 extending radially inward towards the axis of the handle 20 to slide over the small diameter proximal portion 93 of the body cap 90 and abut against the retainer stop 99. Projecting from the inner surface of the curved, funnel-shaped surface 62 are two ejector wires 70, which extend axially through the coaxially aligned ejector apertures 91 in the end plate 97, ejector channels 86, and ejector apertures 27 in the cover ledge 29 of the handle 20 to terminate outside the distal end 22 adjacent the nipple 23.

An electric cable 100 extends through the outer cable aperture 64, the inner cable aperture 98, the cable path 89, and terminates in a cable distal end 102 which extends through the crimp retainer 111, or as previously mentioned may be connected to some other electrical interconnection device such as a printed circuit board. The other end of the cable 100 is configured for electrical connection to a thermometer (not shown).

Figure 8:
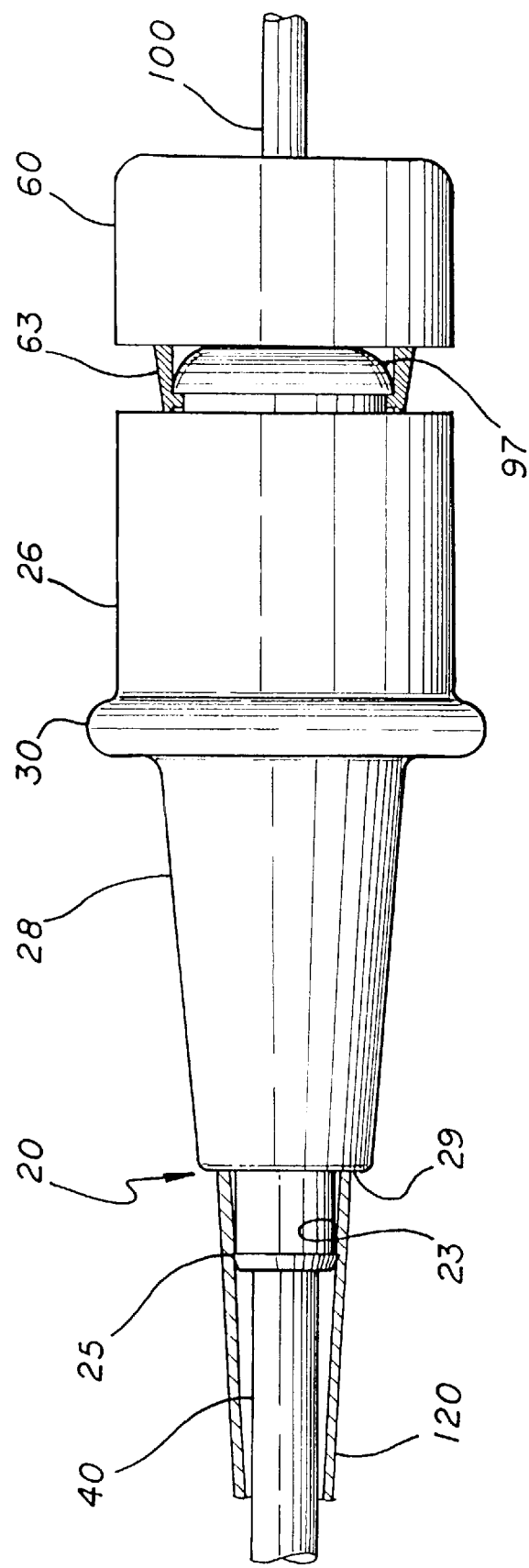
FIG. 8 is a side view, partially in cross section, of part of the probe and probe handle depicted in FIG.1, showing the probe cover mounted to the retaining device at the handle.

With continued reference to FIGS. 1, 2 and 3, the probe shaft 40 extends through the handle distal end 22 and the shaft channel 85 and terminates in a shaft proximal end 44 which is seated against the shaft retainer 87 of inner body 80. A shaft lumen 42 extends through the shaft 40 to a shaft distal tip 41. The shaft distal tip 41 typically houses a sensing element such as a thermistor, and the shaft lumen 42 houses electrical conductors connecting the sensing element with the electric cable 100. The electric cable 100 contains one or more electrical leads that connect to the electrical conductors running through the shaft lumen 42 (for clarity, these conductors and leads are not shown in the figures). The probe shaft should be manufactured from a tough, resilient, and moderately flexible material that is moisture resistant. A preferred material of construction of the probe shaft 40 is polycarbonate. With reference now to FIGS. 7(a), 7(b), and 8 in combination, in a preferred method of use of the probe of the present invention, the probe cover 120 is mounted over the probe shaft 40 to contact the distal tip 41 of the shaft and abut against the cover ledge 29. The probe cover 120 contacts the distal tip of the probe shaft 40 to conduct heat from the patient to the distal tip, and is typically manufactured from a semi-rigid, pliant material, e.g. a thermoplastic material such as polyethylene. The probe cover 120 is formed with an open end that slides over the probe shaft 40 and contacts the barb 25 so that as the probe cover is slid by the user down the probe shaft and over the nipple 23, the barb deforms the open end of the probe cover into an oval shape, thereby causing hoop stress in the open end of the cover to secure the cover thereto.

The force that must be exerted by the user in securing the probe cover 120 onto the barb 25 is lessened by the two flats or planes 43 (FIG. 3) formed in the nipple 23, which allow the open end of the probe cover to deform into a generally oval shape to slip over the barb but do not require the total circumference of the cover open end to expand to more than an insignificant extent. Therefore, by allowing the circumference of the open end of the probe cover to remain approximately the same while being mounted upon the probe, the probe cover is secured to the handle largely by the shape memory force within the probe cover that tends to return the probe cover to its originally molded shape. Because of the pliable material selected to form the probe cover, the force that must be exerted by the user to mount the probe cover is relatively limited. By maintaining the required force within a limited, and relatively low, range, the tolerances that must be maintained in the manufacturing of the probe cover 120 are considerably looser because even covers with open ends that are smaller than specified can still be secured to the nipple 23 with relative ease and safety.

In a preferred embodiment, the probe shaft is longer than the probe cover. However, the probe of the present invention is designed to function equally well with probe covers spanning a range of lengths. Thus, even if the probe cover 120 is substantially shorter than the probe, the cover will still be securely fit onto the probe 10 due to the axial displacement afforded to the shaft 40 by the sliding motion of the inner body 80. With particularity, as the probe cover 120 is mounted upon the shaft 40, it first contacts the tip 44 of the shaft and, as the user continues to apply axial pressure upon the cover, the shaft is urged into the probe handle 20 by the cover. The shaft proximal end 41, acting through the shaft retainer 87, urges the inner body 80 against the coil spring 110. The coil spring 110 preferably provides a force of between one half and one pound, and is therefore easily overcome by the user mounting the probe cover 120. The inner body 80 thus allows the shaft 40 to slide within the handle 20 until the open end of the probe cover 120 slides over the nipple 23 and contacts the ledge 29. The probe cover is secured in position by the barb 25.

Thus, in a preferred method of use of the probe 10 of the present invention, the user grasps the probe handle 20 and urges the probe shaft 40 into the probe cover 120 until the open end of the cover seats against the ledge 29. As the open end of the probe cover 120 begins to slide over the nipple 23, it urges the ejector wires 70 to slide toward the proximal end 24, which in turn push the ejector control 60 axially out of, and away from, the handle proximal end (FIG. 7b and 8). The axial movement of the ejector control 60 ends when the probe cover is fully seated against the ledge 29 and thus no longer urging the ejector wires 70 into the handle 20, and is fully arrested by the ejector stop 66 sliding over the small diameter portion 93 of the body cap 90 and stopping against the retainer stop 99(FIG. 9).

A significant advantage provided by the spring loaded shaft 40 of the probe 10 of the present invention lies in the fact that the force exerted by the shaft tip 41 against the inner surface of the probe cover 120 is provided solely by the coil spring 110, and is thus always within a predetermined range regardless of the degree to which the probe cover has been seated onto the probe handle 20, whether due to user error or variations in the probe cover length. Thus, the quality of the contact between the probe cover 120 and the probe shaft tip 41 is always the same, which assists in the rapid measurement of a patient's temperature.

The design disclosed above represents a significant improvement in the art because, due to the slim, elongated design of the probe, the user of the probe tends to naturally rest his or her thumb onto the ejector control 60 while trying to maintain the probe tip in the same location within the patient's body. Therefore, the possibility is always present that the operator may apply too much pressure upon the ejector control 60, such as perhaps when trying to maintain a steady grip on the probe while taking the temperature of an impatient child or a patient in a lot of pain, and thus inadvertently urge the cover slightly off the handle 20. As detailed above, such an occurrence would not affect the time required for the probe of the present invention to accurately predict the patient's temperature because the coil spring 110 maintains the contact stress between the probe cover 120 and the probe shaft tip 41 within a predetermined, and acceptable, range regardless of the position of the probe cover relative to the probe handle. Therefore, by separating or decoupling the probe cover ejection mechanism from the probe shaft, the probe of the present invention is less susceptible to operator error.

With continued reference to FIG. 7, after the probe 10 has been used for its intended purpose, e.g. measuring a patient's temperature, the probe cover 120 can be easily and safely discarded by the user simply by grasping the handle 20 and urging the ejector control 60 toward the handle 20, thereby pushing the ejector wires 70 out of the distal end 22 and into the rim of the probe cover open end to push the cover off the nipple 23. Once the probe cover 120 has been discarded, the probe shaft 40 is free to spring back to its fully extended position as the coil spring 110 urges the inner body 80 back toward the tapered portion 28.

As will be appreciated, discarding the probe cover 120 may be accomplished by the user with just one hand simply by grasping the handle 20 with the index and middle fingers and pushing the ejector control 60 with the thumb. In this manner, the probe cover 120 does not have to be physically handled by the user once it has been contaminated, and thus the probe 10 of the present invention greatly enhances the sanitary safety of the temperature taking procedure. In addition, the shaft displacement feature of the probe allows the use of probe covers of varying lengths and thus eliminates the need for tightly controlled tolerances, and the high costs associated therewith, in the manufacturing of probe covers suitable for use with the probe. Further modifications and improvements may additionally be made to the device disclosed herein without departing from the scope of the invention. Accordingly, it is not intended that the invention be limited, except as by the appended claims.

What is claimed is:

1. A temperature probe for use with a probe cover having a closed distal end and an open proximal end, comprising:
   a shaft having a distal end for receipt into the probe cover through the probe cover open proximal end and a proximal section;
   a handle disposed at the proximal section of the shaft such that the shaft extends into the handle for axial movement therein between a fully retracted position and a fully extended position, the handle having a proximal end and a distal end;
   a retention device located at the distal end of the handle configured to engage the open proximal end of the probe cover and retain it in position on the shaft;
   a biasing member disposed within the handle and urging the shaft with a force to the extended position, the biasing member providing less force to move the shaft into the extended position than the force that the retention device is providing to retain the probe cover on the shaft;
   an ejector control having a distal end slidably received in the proximal end of the handle and having a proximal end for use in receiving force that urges the ejector control into the handle, the ejector control being decoupled from the both the shaft and biasing member; and
   an ejector member connected with the ejector control and extending longitudinally through the handle to exit the handle adjacent the shaft and contact the probe cover at its open proximal end whereby moving the ejector control in a predetermined direction will cause the ejector member to press against the proximal end of the probe cover and displace it from contact with the retention device, whereby the probe cover may be removed from contact with the probe.

2. The temperature probe of claim 1 wherein the retention device comprises a raised lip formed in a shape different that than of the proximal end of the probe cover such that when mounting the probe cover onto the retention device, the proximal end of the probe cover is forced to conform to the shape of the lip.

3. The temperature probe of claim 2 wherein the probe cover has a circumferential size and the raised lip has a circumferential size that is approximately equal to the circumferential size of the probe cover whereby the probe cover is held onto the lip by the forces exerted against the lip by the probe cover as a result of the different shape the probe cover has been forced into by the lip.

4. The temperature probe of claim 3 wherein the lip is generally oval in shape.

5. The temperature probe of claim 4 wherein the ejector member comprises two ejector devices and the oval shape of the lip includes two flat portions diametrically located at which the ejector devices exit the handle to contact and eject the probe cover.

6. The temperature probe of claim 1 wherein the retention device comprises at least one barb protruding radially outwardly adjacent the distal end of the handle which secures the probe cover thereto.

7. The temperature probe of claim 1 wherein the biasing member comprises a spring.

8. The temperature probe of claim 7 wherein the spring is placed under compression when a probe cover is mounted to the probe, whereby the spring continually urges the probe against the probe cover.

9. The temperature probe of claim 1 wherein the biasing member is selected such that the force it exerts against the shaft is within a selected range.

10. The temperature probe of claim 9 wherein the range of force exerted by the biasing member is between one half pound and one pound.

11. The temperature probe of claim 1 wherein the ejector member comprises two ejection devices located diametrically opposite each other about the shaft.

12. The temperature probe of claim 11 wherein the ejector devices comprise pins located in the handle so as when the ejection control is activated, the ejector devices contact the proximal end of the probe cover and move it in a distal direction off the retention device.

13. The temperature probe of claim 1 wherein the length of the probe is selected to be longer than the probe cover such that when the probe cover is properly mounted on the probe the probe shaft is retracted.

14. The temperature probe of claim 1 wherein the ejector control comprises an end surface formed with an aperture therein for slidably accepting an electrical conductor therethrough.

15. The temperature probe of claim 14 wherein the end surface of the ejector control is curved outwardly from the aperture to control curvature to which the conductor is subjected as it exits the probe.

16. The temperature probe of claim 14 wherein the end surface has a curved funnel shape with a curvature selected to control the maximum amount of curvature of a cable extending through the opening.

17. The temperature probe of claim 1 wherein the ejector member is substantially tubular.

18. The temperature probe of claim 1 wherein the retention device comprises a lip protruding radially outwardly from the distal end of the handle and having a diameter selected to be larger than the inside diameter of the probe cover thereby securing the probe cover thereupon.

19. A temperature probe for use with a probe cover having a closed distal end and an open proximal end, comprising:
   a shaft having a distal end for receipt into the probe cover through the probe cover open proximal end and a proximal section;
   a handle disposed at the proximal section of the shaft such that the shaft extends into the handle for axial movement therein between a fully retracted position and a fully extended position, the handle having a proximal end and a distal end;
   a retention device located at the distal end of the handle configured to engage the proximal end of the probe cover and retain it in position on the shaft, the retention device comprising a raised lip formed in a shape different that than of the proximal end of the probe cover such that when mounting the probe cover onto the retention device, the proximal end of the probe cover is forced to conform to the shape of the lip;
   a biasing member disposed within the handle and urging the shaft to the extended position, the biasing member providing less force to move the shaft into the extended position than the force that the retention device is providing to retain the probe cover on the shaft;
   an ejector control device having a distal end slidably received in the proximal end of the handle and having a proximal end for use in receiving force that urges the ejector control into the handle, the ejector control device being decoupled from both the shaft and biasing member; and
   an ejector member connected with the ejector control and extending longitudinally through the handle to exit the handle adjacent the shaft and contact the probe cover at its proximal end whereby moving the ejector control in a predetermined direction will cause the ejector member to press against the proximal end of the probe cover and displace it from contact with the retention device, whereby the probe cover may be removed from contact with the probe.

20. The temperature probe of claim 19 wherein the circumferential size of the lip is approximately equal to the circumferential size of the probe cover whereby the probe cover is held onto the lip by the forces exerted against the lip by the probe cover as a result of the different shape the probe cover has been forced into by the lip.

21. The temperature probe of claim 20 wherein the lip is generally oval in shape.

22. The temperature probe of claim 21 wherein the ejector member comprises two ejector devices.

23. The temperature probe of claim 22 wherein the oval shape of the lip includes two flat portions diametrically located at which the ejector devices exit the handle to contact and eject the probe cover.

24. A temperature probe for use with a probe cover having a closed distal end and an open proximal end, comprising:
   a handle having a proximal end and a distal end;
   a probe shaft having a proximal section mounted to the handle distal end and a distal end for receipt into the probe cover through the probe cover open proximal end;
   a retention device located at the distal end of the handle configured to engage the proximal end of the probe cover and retain it in position on the shaft; and
   an ejector member located at the handle to exit the handle adjacent the probe shaft and contact the probe cover at its proximal end, the ejector member being decoupled from the shaft;
   whereby moving the ejector member in a distal direction will cause the ejector member to press against the proximal end of the probe cover and displace it from contact with the retention device.

25. The temperature probe of claim 24, wherein retention device comprises a nipple surrounding the distal end of the handle and having an open lumen for receipt of the shaft proximal section therethrough.

26. The temperature probe of claim 25, wherein the nipple is formed with a cross section having a different shape than the probe cover open end.

27. The temperature probe of claim 26, wherein the nipple cross section is substantially an oval.

28. The temperature probe of claim 27, wherein the nipple has two diametrically opposed flat surfaces across which the ejector member traverses into contact with the probe cover.

29. The temperature probe of claim 28, wherein the ejector member comprises two pins located diametrically opposite one another adjacent the probe shaft and adapted to contact the proximal end of the probe cover to displace it.

30. The temperature probe of claim 29, further comprising an ejector control having a distal end slidably received in the proximal end of the handle to displace the ejector member and having a proximal end for use in receiving force to urge the ejector control into the handle.

31. The temperature probe of claim 24, wherein the probe shaft proximal section extends into the handle for axial movement therein between a fully retracted position and a fully extended position.

32. The temperature probe of claim 31, further comprising:
   a biasing member disposed within the handle and urging the shaft to the extended position, the biasing member providing less force to move the shaft into the extended position than the force that the retention device is providing to retain the probe cover on the shaft.

* * * * *

UNITED STATES PATENT AND TRADEMARK OFFICE
CERTIFICATE OF CORRECTION

PATENT NO. : 6,461,037 B1
DATED : October 8, 2002
INVENTOR(S) : Stephen H. O'Leary It is certified that error appears in the above-identified patent and that said Letters Patent is hereby corrected as shown below:

Drawings,
Figure 7a should be deleted to appear as per attached Figure 7a.

Column 6,
Line 32, change "handle inner", to read -- cover --.

Column 7,
Line 57, start a new paragraph with the sentence starting with "With reference now to…".

Column 8,
Line 32, after "80" and before "." (peroid), add -- FIG. 2 --.
Line 58, change "(FIG. 9)", to read -- (FIG. 2) --.

Column 9,
Line 24, change "FIG. 7", to read -- FIG. 7a and 7b --.

Signed and Sealed this

Tenth Day of June, 2003

JAMES E. ROGAN
*Director of the United States Patent and Trademark Office*

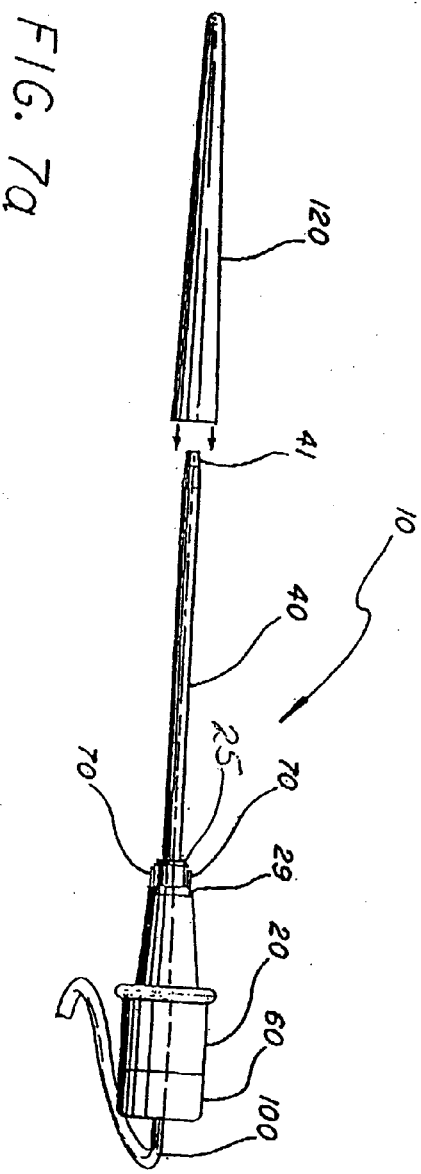
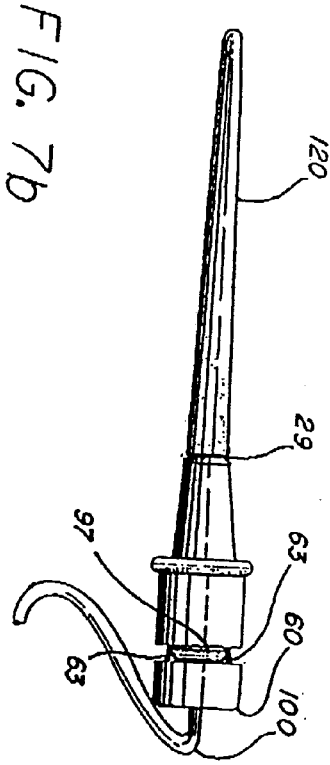
FIG. 7a
FIG. 7b